(12) United States Patent
Li et al.

(10) Patent No.: US 10,088,710 B2
(45) Date of Patent: Oct. 2, 2018

(54) SUBSTRATE AND PHOTOELECTRIC DISPLAY DEVICE

(71) Applicant: BOE TECHNOLOGY GROUP CO., LTD., Beijing (CN)

(72) Inventors: Wenbo Li, Beijing (CN); Xinyin Wu, Beijing (CN); Yong Qiao, Beijing (CN); Hongfei Cheng, Beijing (CN); Pan Li, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 29 days.

(21) Appl. No.: 14/894,180

(22) PCT Filed: Jun. 17, 2015

(86) PCT No.: PCT/CN2015/081621
§ 371 (c)(1),
(2) Date: Nov. 25, 2015

(87) PCT Pub. No.: WO2016/107095
PCT Pub. Date: Jul. 7, 2016

(65) Prior Publication Data
US 2016/0202514 A1 Jul. 14, 2016

(30) Foreign Application Priority Data

Jan. 4, 2015 (CN) .................... 2015 2 0005467 U

(51) Int. Cl.
*G02F 1/1339* (2006.01)
*G02F 1/1333* (2006.01)

(52) U.S. Cl.
CPC ........ *G02F 1/1339* (2013.01); *G02F 1/13394* (2013.01); *G02F 2001/133388* (2013.01); *G02F 2201/503* (2013.01)

(58) Field of Classification Search
CPC .................... G02F 1/1339; G02F 1/13394
(Continued)

(56) References Cited

U.S. PATENT DOCUMENTS

| 5,777,713 A | * | 7/1998 | Kimura | G02F 1/13394 349/156 |
| 2003/0112405 A1 | * | 6/2003 | Kim | G02F 1/1339 349/156 |

(Continued)

FOREIGN PATENT DOCUMENTS

| CN | 101320173 A | 12/2008 |
| CN | 202166809 U | 3/2012 |

(Continued)

OTHER PUBLICATIONS

International Search Report dated Oct. 10, 2015.

*Primary Examiner* — Phu Vu
(74) *Attorney, Agent, or Firm* — Dilworth & Barrese, LLP

(57) ABSTRACT

A substrate and a photoelectric display device including the substrate are provided. The substrate includes a display region and seal material disposed in a periphery thereof. The substrate further includes a trapping buffer region which is disposed between the display region and the seal material and receives photoelectric display media. By providing the trapping buffer region, impact on the seal material by the excessive photoelectric display media can be mitigated or eliminated when the photoelectric display device is subjected to an external force or is flexed. The life time of the seal material is prolonged. A leakage of the photoelectric display media is avoided.

18 Claims, 3 Drawing Sheets

(58) Field of Classification Search
USPC .................................................. 349/155–156
See application file for complete search history.

(56) References Cited

U.S. PATENT DOCUMENTS

2008/0254839 A1   10/2008  Lee
2013/0235314 A1*   9/2013  Moriwaki ............. G02F 1/1333
                                                       349/124

FOREIGN PATENT DOCUMENTS

CN        204389840 U    6/2015
JP         2008233720 A   10/2008

* cited by examiner

SUBSTRATE AND PHOTOELECTRIC DISPLAY DEVICE

TECHNICAL FIELD

Embodiments of the present disclosure relate to a substrate and a photoelectric display device.

BACKGROUND

A photoelectric display device such as a liquid crystal display device, an OLED display device or an electronic paper and etc., has a structure typically comprising an upper substrate and a lower substrate which are arranged opposite to each other, photoelectric display media disposed between the upper and lower substrates, and seal material for sealing the photoelectric display media therein. As the liquid crystal display technology is the most commonly used display technology at present, the liquid crystal display technology is exemplified. That is to say, a liquid crystal display device comprises therein an upper substrate and a lower substrate which are arranged opposite to each other, liquid crystals disposed between the upper and lower substrates, and seal material for sealing the liquid crystals therein. Since liquid crystal is a substance state between liquid state and crystal state, it has properties of liquid and of crystal concurrently, such as liquidity. When a panel of the liquid crystal display device is subjected to an external force, excessive liquid crystals will collide with seal agent of the liquid crystal cell. Especially for a flexible liquid crystal display panel, since a flexible liquid crystal display device may be flexed during use, a flow of internal liquid crystals becomes more frequent, and the impact on the seal agent of the liquid crystal cell is generated more frequently by the flow which shortens the life time of the liquid crystal display device.

To sum up, when a panel of a photoelectric display device produced by conventional photoelectric display technology is subjected to an external force, photoelectric media collide with the seal agent for several times, which shortens the life time of the seal agent and causes the life time of the photoelectric display device to be shortened.

SUMMARY

At least one embodiment of the present disclosure provides a substrate and a photoelectric display device. By means of a photoelectric display medium trapping buffer region disposed between a display region and seal material, an impact on the seal material by the plethoric photoelectric display media can be reduced or eliminated when the photoelectric display device is flexed due to an external force. The life time of the seal material is prolonged and leakage of the photoelectric display media can be avoided. Therefore, the life time of the whole photoelectric display device is prolonged.

At least one embodiment of the present disclosure provides a substrate for a display device, which is provided with a photoelectric display medium trapping buffer region disposed between a display region and seal material.

By means of the photoelectric display medium trapping buffer region disposed between the display region and the seal material of the substrate, an effective damping is generated when the photoelectric display device is subjected to a force. When the photoelectric display device is flexed due to an external force, an impact on the seal material by the plethoric photoelectric display media can be reduced or eliminated. The life time of the seal material is prolonged and leakage of the photoelectric display media can be avoided. Therefore, the life time of the whole photoelectric display device is prolonged.

In one embodiment according to the present disclosure, the trapping buffer region on the substrate comprises a groove.

In one embodiment according to the present disclosure, the trapping buffer region on the substrate comprises a plurality of sets of grooves, each of which comprises at least one groove. The at least one groove is arranged between the display region and the seal material in a gradient manner in terms of its dimension. The larger the dimension is, the farther the distance to the display region is.

In one embodiment according to the present disclosure, the dimension comprises a volume of the groove, an opening area of the groove, an opening depth of the groove or an opening width of the groove.

In one embodiment according to the present disclosure, the grooves having different areas in the groove set are arranged between the display region and the seal material in a gradient manner, and wherein the larger the opening area of the groove is, the farther the distance to the display region is.

By means of the arrangement in a gradient manner of the grooves in the set, impact on the seal agent by the photoelectric display media in the photoelectric display device is mitigated and thereby ensuring the damping effect on the seal agent.

In one embodiment according to the present disclosure, the substrate further comprises a spacer post disposed in the groove.

In one embodiment according to the present disclosure, the groove comprises a patterned groove formed by a combination of a plurality of grooves.

In one embodiment according to the present disclosure, the substrate further comprises a first spacer post disposed in a recessed region of the patterned groove and a second spacer post disposed in a non-recessed region of the patterned groove.

In one embodiment according to the present disclosure, the groove is a grid-like groove.

In one embodiment according to the present disclosure, the substrate further comprises a first spacer post disposed on the grid of the grid-like groove and a second spacer post disposed in the grid of grid-like groove.

Through a grid-like design of groove, a stable storage of the photoelectric display media after the damping can be achieved. Different spacer posts are designed by means of the gird-like groove, and thus a uniform thickness of the photoelectric display medium cell can be achieved.

In one embodiment according to the present disclosure, the substrate further comprises a protrusion positioned in periphery of the groove.

By means of the protrusion positioned in periphery of the groove, impact on the seal material by the photoelectric display media is partially mitigated.

In one embodiment according to the present disclosure, the spacer post is disposed on the same substrate as the groove or is disposed on a second substrate which is oppositely disposed.

In one embodiment according to the present disclosure, the protrusion is positioned in the same substrate as the groove or is disposed on a second substrate which is oppositely disposed.

In one embodiment according to the present disclosure, the groove is disposed on a black matrix or a metallic protection layer.

At least one embodiment of the present disclosure provides a photoelectric display device comprising the substrate as described above.

By means of the photoelectric display device comprising the substrate as described above, an effective damping is generated when the panel of the photoelectric display device is subjected to a force. Impact on the seal material by the plethoric photoelectric display media, when the photoelectric display device is pressed or is flexed, can be mitigated or eliminated. The life time of the seal material is prolonged. Leakage of the photoelectric display media can be avoided. Therefore, the life time of the whole photoelectric display device is prolonged.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

Figure 1:
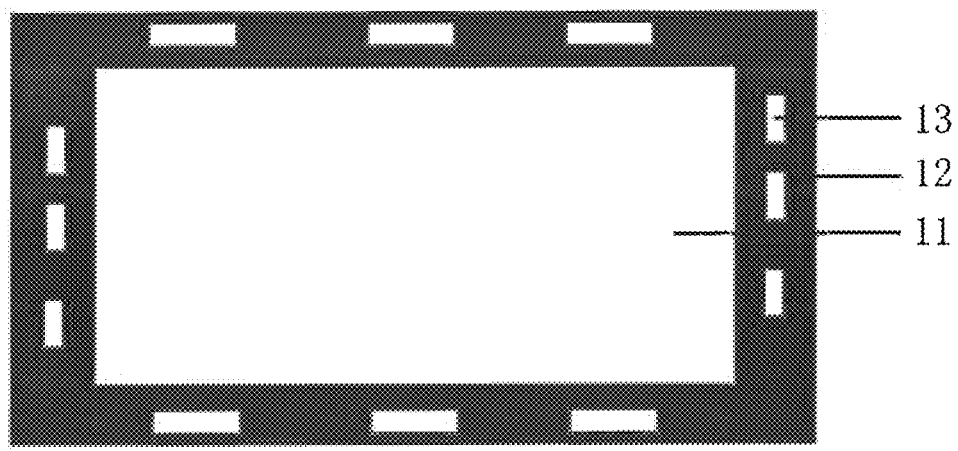
FIG. 1 is an illustrative structural view of a substrate according to an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

At least one embodiment of the present disclosure provides a substrate for a display device, wherein a photoelectric display medium trapping buffer region is disposed between a display region and seal material.

By providing a photoelectric display medium trapping buffer region between the display region and the seal material, impact on the seal material by the photoelectric display media when the photoelectric display device is subjected to an external force can be mitigated. When the photoelectric display device is subjected to an external force or is flexed, the photoelectric display media are pressed and thus flow towards the seal material disposed at the outer side. The photoelectric display trapping buffer region can receive a portion or all of the photoelectric display media which are pressed and flow out of the display region, so that impact on the seal material by the photoelectric display media can be mitigated or eliminated when the photoelectric display device is pressed or is flexed.

For example, the seal material comprises seal agent and the photoelectric display medium comprises liquid crystal.

For example, the trapping buffer region on the substrate comprises a groove.

For example, the trapping buffer region comprises a plurality of grooves which are evenly distributed between the display region and the seal material.

For example, the trapping buffer region on the substrate comprises a plurality of groove sets, wherein each groove set comprises at least one groove, the groove in the groove set is arranged between the display region and the seal material in a gradient manner in terms of its dimension.

For example, the dimension of the groove comprises a volume of the groove, an opening area of the groove, an opening depth of the groove or an opening width of the groove. The volume of the groove is a capacity of the groove, i.e., the amount of liquid crystal which can be damped by the groove when the substrate is a substrate on the liquid crystal display.

For example, the grooves having different areas in the groove set are arranged in a gradient manner between the display region and the seal material, wherein the larger the opening area of the groove is, the farther the distance to the display region is.

By means of the gradient arrangement of the grooves in the set, impact on the seal agent by the photoelectric display media in the photoelectric display device is mitigated and thereby ensuring the damping effect for the seal agent.

Each of the grooves comprises at least one spacer post, wherein the spacer post has a cross section of square or of circular. The cross section of the spacer post is not limited to the shape described in the embodiments of the present disclosure.

The substrate further comprises a spacer post disposed in the groove.

The groove set comprises a patterned groove formed by a combination of a plurality of grooves.

The substrate further comprises a first spacer post disposed in a recessed region of the patterned groove and a second spacer post disposed in a non-recessed region of the patterned groove. That is to say, the first spacer post is disposed in the patterned groove, and the second spacer post is disposed between the patterned groove and an adjacent groove which means that the second spacer post is positioned on non-recessed region between two patterned grooves.

The patterned groove comprises a grid-like groove or a groove made of an irregular opening.

When the patterned groove comprises a grid-like groove, the substrate further comprises a first spacer post disposed on the grid of the patterned groove and a second spacer post disposed in the grid of the patterned groove. For grid-like grooves having different depths, the first spacer post and the second spacer post are formed by a grey scale exposure process.

For example, the spacer post is disposed on the same substrate as the groove or on a second substrate which is oppositely arranged.

For example, the same substrate as the groove is a color filter substrate and the second substrate is an array substrate.

For example, the substrate further comprises a protrusion disposed in a periphery of the groove.

For example, the substrate further comprises a protrusion which is positioned in front of the groove or is positioned behind the groove, wherein the term "in front of the groove" refers to a place closer to the display region than the groove, and the term "behind the groove" refers to a place farther to the display region than the groove.

The protrusion can be made of an over coating layer (OC layer), or the protrusion can be made of at least one layer of Red, Green, Blue (RGB) layers, or can be made of an OC layer and at least one layer of the RGB layers.

By means of the protrusion, impact on the seal agent by the photoelectric display media in the photoelectric display device is partially mitigated and thus the life time of the seal agent is prolonged.

The protrusion is disposed on the same substrate as the groove or is disposed on an opposite substrate which is opposite to the substrate in which the groove is positioned.

The groove is disposed on a black matrix or a metallic protection layer. For example, if the substrate is a color filter substrate, the groove is disposed on a black matrix. Alternatively, if the substrate is an array substrate, the groove is disposed on a metallic protection layer.

For example, the metallic protection layer is a passivation layer or an insulation layer.

For example, the photoelectric display device can be a liquid crystal display device.

At least one embodiment of the present disclosure provides a photoelectric display medium display device comprising the substrate as described above.

Hereinafter, the substrate according to the embodiments of the present disclosure is further described with reference to the drawings.

Referring to FIG. 1, when grooves are disposed on a color filter substrate, grooves 13 are evenly distributed on a black matrix 12 on a periphery of a display region 11 of the color filter substrate. The number of the grooves 13, the depth of the grooves 13 and the shape of the grooves 13 can all be set as required. When the grooves are disposed on an array substrate, the grooves are disposed on a metallic protection layer.

The grooves formed on the black matrix or the metallic protection layer are configured to serve an effective damping function for the seal agent of the liquid crystal cell and prevent excessive liquid crystals from impacting the seal agent of the liquid crystal cell when the liquid crystal panel is subjected to a force. Thus, the life time of the panel is increased.

Figure 2:
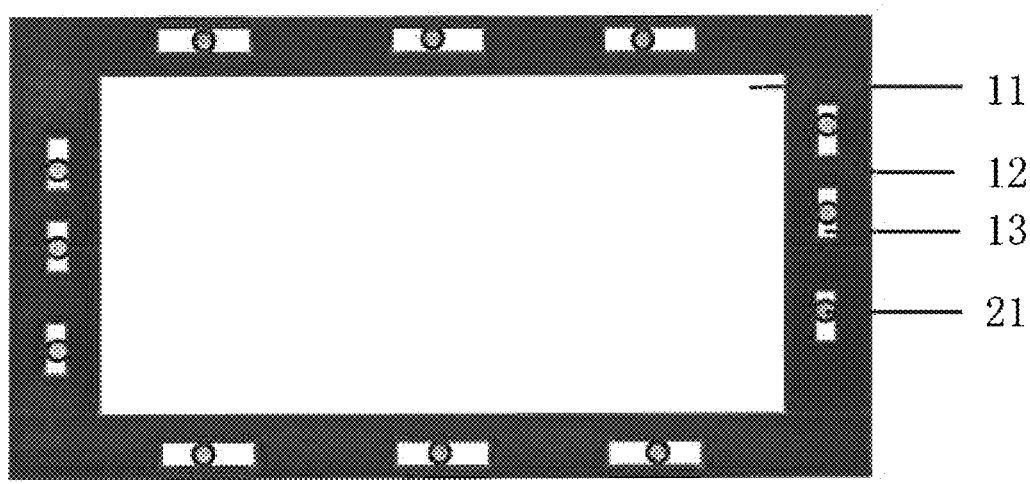
FIG. 2 is an illustrative structural view of a substrate provided with a spacer post according to an embodiment of the present disclosure.

Referring to FIG. 2 which is a modification on the basis of FIG. 1, a spacer post 21 is disposed in the groove 13, thereby ensuring an even thickness of the liquid crystal cell and a uniform distribution in thickness of the liquid crystal cell.

The groove 13 on the black matrix 12 is modified on the basis of FIG. 2, and a groove set is provided. Each groove set comprises a plurality of grooves. The grooves in each groove set have different shapes so that a damping effect for the seal agent of the liquid crystal cell can be ensured. Since there are numerous variations in groove combination, the present disclosure cannot enumerate all the possibilities of the groove combination. A detailed illustration is given below for a variation of gradient groove combination.

Figure 3:
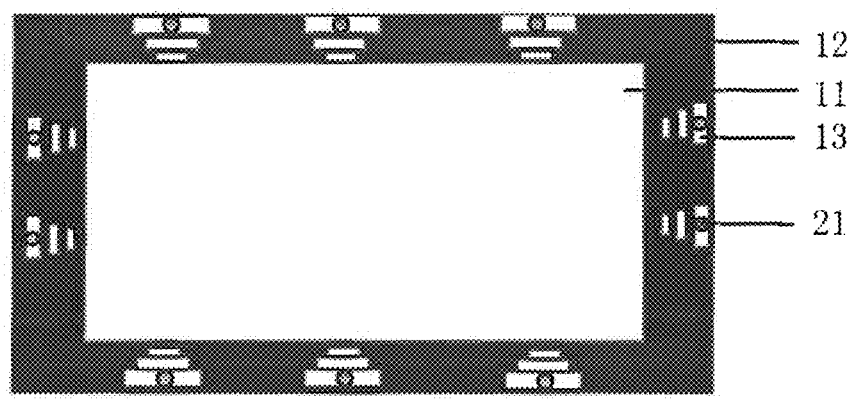
FIG. 3 is an illustrative structural view of a substrate provided with grooves arranged in a gradient distribution according to an embodiment of the present disclosure.

Referring to FIG. 3, according to an opening area of grooves 13 in each groove set, the grooves 13 in each groove set are arranged in sequence on the black matrix 12 in a gradient manner. The larger the opening area of the groove is, the farther the distance to the display region is.

Figure 4:
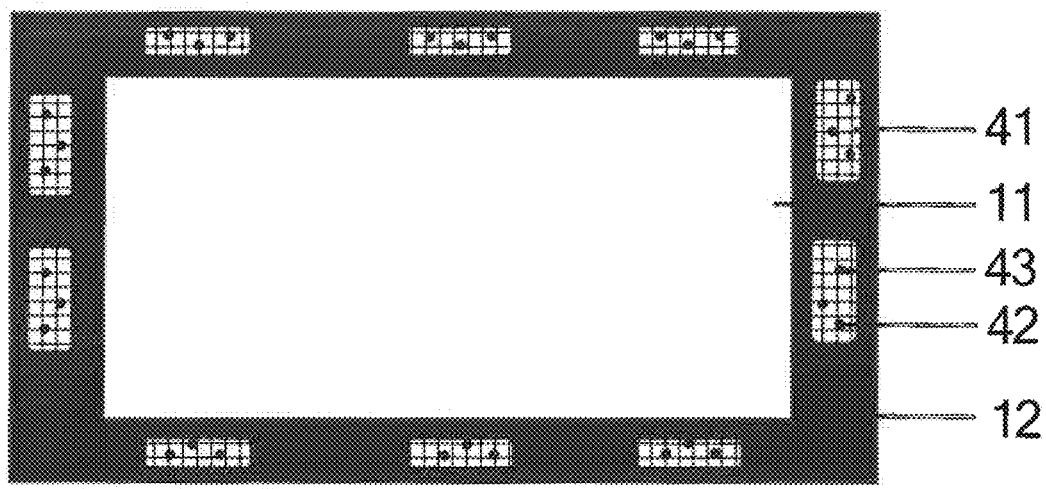
FIG. 4 is an illustrative structural view of a substrate provided with grooves arranged in a grid manner according to an embodiment of the present disclosure.

Similarly, on the basis of FIG. 2, the grooves 13 on the black matrix 12 are designed to be in a grid manner, so as to form grid-like grooves 41, thereby ensuring that the liquid crystals can be stably stored in the grid of grooves after the damping. Further, different depths of grooves can be obtained by a grey scale exposure process and thus a primary spacer post 42 and a secondary spacer post 43 are formed. The primary spacer post 42 can be disposed on the grid, while the secondary spacer post 43 can be disposed within the grid. The primary spacer post being disposed on the grid means that the primary spacer post is disposed on a non-recessed region between the grooves. The secondary spacer post 43 being disposed within the grid means that the secondary spacer post is disposed on a recessed region of the groove. FIG. 4 illustrates an arrangement manner of gird-like grooves 41, primary spacer posts 42 and secondary spacer posts 43, but the present disclosure is not limited to this arrangement manner.

Figure 5:
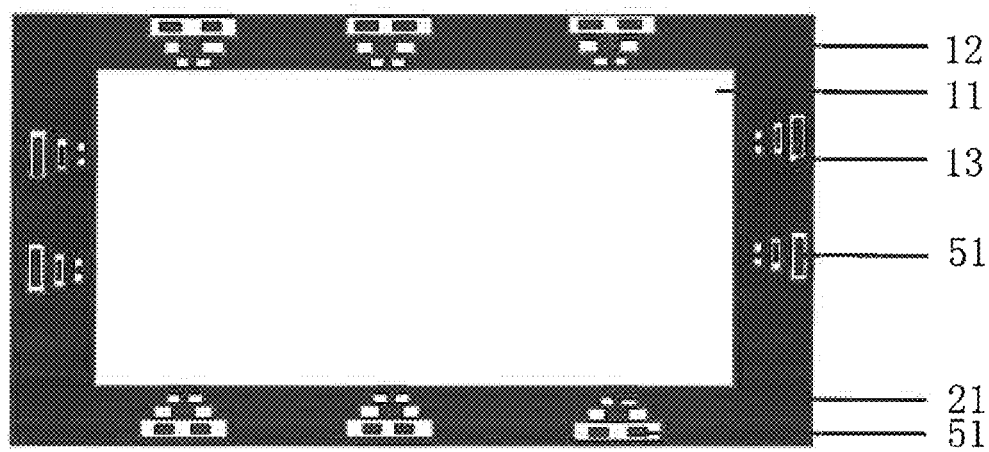
FIG. 5 is an illustrative structural view of a substrate provided with a plurality of spacer posts according to an embodiment of the present disclosure.

Since the spacer post can have numerous shapes in cross section, such as a cross section of square and a cross section of circle, a detailed illustration will not be elaborated. Moreover, there can be a plurality of spacer posts in one groove. On the basis of FIG. 3, a spacer post 51 having a cross section of square can be added and two spacer posts can be added in a part of grooves, and thus an arrangement as illustrated in FIG. 5 can be obtained.

Figure 6:
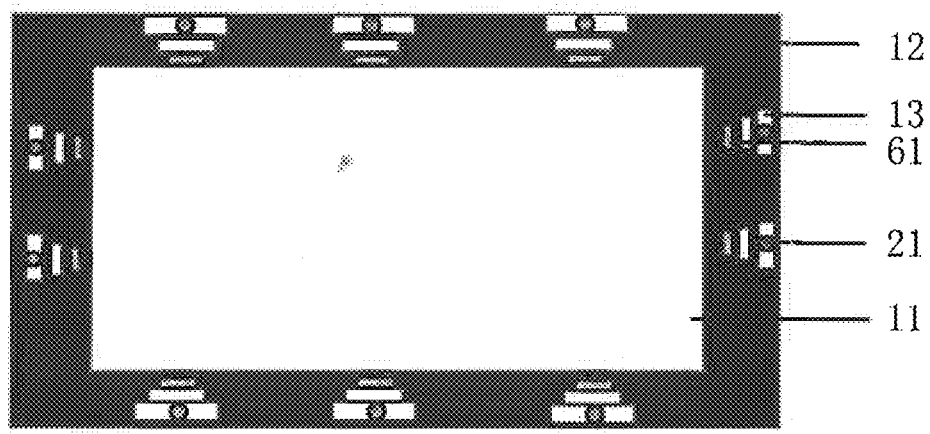
FIG. 6 is an illustrative structural view of a substrate provided with protrusions and grooves according to an embodiment of the present disclosure.

In order to achieve a certain damping impact of the liquid crystals on the seal agent of the liquid crystal cell, a protrusion 61 and a groove can be provided simultaneously, and the protrusion 61 can be positioned on the periphery of the groove. For example, the protrusion 61 can be positioned in front or the back of the groove. The term "front of the groove" refers to a place closer to the display region than the groove and the term "back of the groove" refers to a place farther to the display region than the groove. Referring to FIG. 6, the color filter substrate provided by the embodiments of the present disclosure comprises a groove 13 and a protrusion 61 positioned in front of the groove. The protrusion 61 can be made of an over coating layer (OC layer) or can be made of at least one layer of an RGB filter, or can be made of an OC layer and at least one layer of the RGB filter layers.

The present disclosure provides a substrate and a photoelectric display device having a photoelectric display medium trapping buffer region for reducing the impact on the seal material. When the photoelectric display device is subjected to an external force or is flexed, the photoelectric display media are pressed and thus flow towards the seal material at the outer side. Therefore, a trapping buffer region can be disposed between the display region and the seal material and receives a partial or all of the whole photoelectric display media which is pressed and flows out of the display region, so that the impact on the seal material by the photoelectric display media can be mitigated or eliminated when the photoelectric display device is flexed. As such, the life time of the seal material is prolonged, and a leakage of the photoelectric display media can be avoided and thus the life time of the entire photoelectric display device is prolonged. An uniform thickness of the photoelectric display medium cell is ensured by adding spacer posts in the grooves and thereby ensuring a consistency in the thickness of the photoelectric display medium cell. By combining protrusions and grooves, the damping effect on the seal material by the photoelectric display media in the photoelectric display device is ensured.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201520005467.5 filed on Jan. 4, 2015, the disclosure of which is hereby entirely incorporated by reference.

The invention claimed is:

1. A substrate for a display device, comprising a display region and seal material disposed in a periphery thereof, the substrate further comprising a trapping buffer region which is disposed between the display region and the seal material and receives photoelectric display media,
wherein the trapping buffer region comprises a plurality of grooves which are spaced apart from each other and disconnected with each other, each of the plurality of grooves has a closed opening in a plane parallel to the substrate, and the plurality of grooves are combined into a patterned groove.

2. A substrate for a display device, comprising a display region and seal material disposed in a periphery thereof, the substrate further comprising a trapping buffer region which is disposed between the display region and the seal material and receives photoelectric display media, wherein the trapping buffer region comprises a plurality of groove sets, each groove set comprises at least one groove, the at least one groove is arranged between the display region and the seal material in a gradient manner in terms of its dimension, wherein the larger the dimension is, the farther the distance to the display region is.

3. The substrate according to claim 2, wherein the dimension can be a volume of the groove, an opening area of the groove, an opening depth of the groove, or an opening width of the groove.

4. The substrate according to claim 1, wherein the substrate further comprises a spacer post disposed in the trapping buffer region.

5. The substrate according to claim 1, further comprising a first spacer post disposed in a recessed region of the patterned groove and a second spacer post disposed on a non-recessed region of the patterned groove.

6. The substrate according to claim 1, wherein the substrate further comprises a protrusion disposed in a periphery of at least one of the grooves.

7. The substrate according to claim 4, wherein the spacer post is disposed on the same substrate as the grooves or is disposed on an opposite substrate which is opposite to the substrate on which the grooves are disposed.

8. The substrate according to claim 6, wherein the protrusion is disposed on the same substrate as the grooves or is disposed on an opposite substrate which is opposite to the substrate on which the grooves are disposed.

9. The substrate according to claim 1, wherein the grooves are disposed on a black matrix or a metallic protection layer.

10. The substrate according to claim 6, wherein the protrusion is made of an over coating layer, or is made of at least one layer of a color filter, or is made of an over coating layer and at least one layer of a color filter.

11. A photoelectric display device, comprising the substrate according to claim 1.

12. The substrate according to claim 2, wherein the substrate further comprises a spacer post disposed in the trapping buffer region.

13. The substrate according to claim 2, wherein the trapping buffer region comprises a plurality of grooves and the plurality of grooves are combined into a patterned groove.

14. The substrate according to claim 2, wherein the substrate further comprises a protrusion disposed in a periphery of the groove.

15. The substrate according to claim 12, wherein the spacer post is disposed on the same substrate as the groove or is disposed on an opposite substrate which is opposite to the substrate on which the groove is disposed.

16. The substrate according to claim 2, wherein the groove is disposed on a black matrix or a metallic protection layer.

17. A photoelectric display device, comprising the substrate according to claim 2.

18. A substrate for a display device, comprising a display region and seal material disposed in a periphery thereof, the substrate farther comprising a trapping buffer region which is disposed between the display region and the seal material and receives photoelectric display media,
wherein the trapping buffer region comprises a plurality of grooves which are spaced from each other and have different depths from each other.

* * * * *